Oct. 9, 1956
F. W. PARRISH
2,766,409
FLUID COOLED ENCAPSULATED RECTIFIER STACK
Filed Feb. 28, 1955
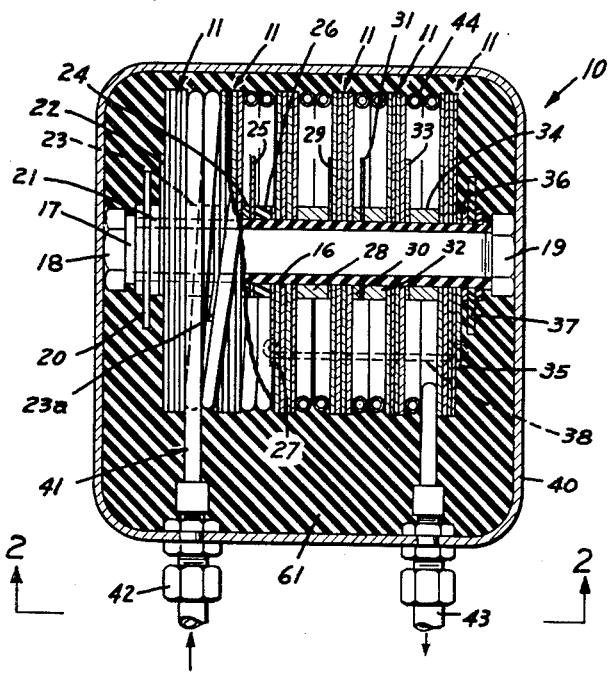
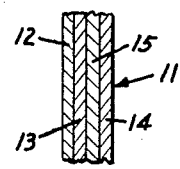
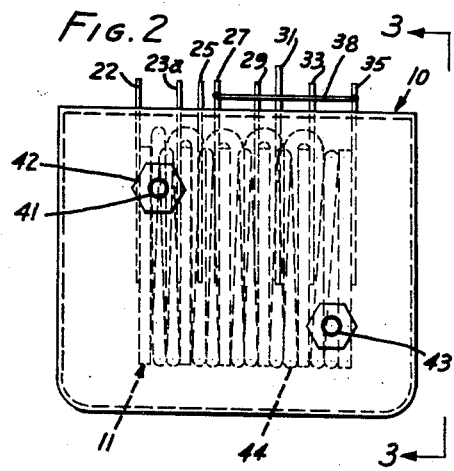
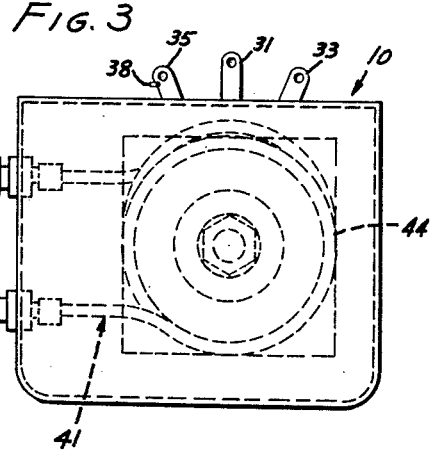
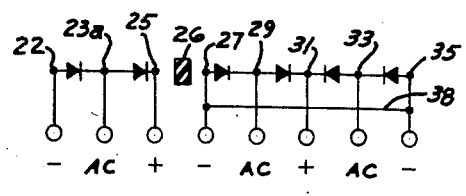
INVENTOR.
FRANK W. PARRISH
BY
D. Gordon Angus
ATTORNEY.

United States Patent Office 2,766,409
Patented Oct. 9, 1956

2,766,409

FLUID COOLED ENCAPSULATED RECTIFIER STACK

Frank W. Parrish, Bellflower, Calif., assignor to International Rectifier Corporation, El Segundo, Calif., a corporation of California Application February 28, 1955, Serial No. 490,865

4 Claims. (Cl. 317—234)

This invention relates to semi-conducting electrical circuit units.

An object of this invention is to provide a rugged construction for a semi-conductor assembly which permits such circuit units to be built in smaller overall size for a given electrical capacity than has heretofore been possible.

An allied object is to provide cooling means for such a semi-conductor construction which serves to remove heat which is developed by flow of current through the semi-conductor elements in the unit.

Dry plate rectifiers provide an advantageous means for rectifying current in many installations where space is at a premium. However, in presently known dry plate rectifiers, the problem of cooling the dry plate rectifiers imposes certain undesirable design limitations. For example, heat produced by the resistance of the rectifier to current flow increases as the square of the current. In order to dissipate this heat, the size of the plates must be increased in order to give sufficient heat transfer area. However, as the size of the plates increases, the rectifier assembly either becomes more fragile, or means must be provided to support and protect it. In either event the weight and size of rectifier assembly increase at a greater rate than the electrical capacity.

A semi-conductor circuit unit according to this invention overcomes these design limitations, and is thereby made more suitable for installations where space must be conserved, and aids in the overall miniaturization of electrical circuits.

The invention is carried out by providing a plurality of semi-conductor elements which may, for example, comprise flat dry-rectifier plates. These semi-conductor elements are maintained in spaced relationship from each other, and may be electrically interconnected in any desired manner to produce a circuit. In accordance with this invention a conduit is located between adjacent semi-conductor elements and in contact with the encapsulating material so that coolant fluid can be passed through the conduit to remove heat generated by the semi-conductor elements.

A feature of the invention resides in embedding the conductor elements together with the conduit in encapsulating material for making the circuit unit rugged and unitary. The coolant which is forced through the conduit will remove heat from the semi-conductor circuit unit.

According to a preferred but optional feature, the semi-conductor elements comprise flat dry-plate rectifiers in spaced parallel relationship with each other, and the conduit is wound in loops between adjacent rectifier plates. The conduit can be a helix, although it need not be such.

An advantage of this construction is that the cooling conduit can be held at the hottest position of the rectifier assembly, the hottest position ordinarily being at or near a central area of the stack.

The above and other features of the invention will be fully understood from the following detailed description and the accompanying drawings, in which:

Fig. 1 is a top view, partly in cutaway cross-section of a semi-conductor circuit unit according to this invention;
Fig. 2 is a side elevation taken at line 2—2 of Fig. 1;
Fig. 3 is a side elevation taken at line 3—3 of Fig. 2;
Fig. 4 is an electrical circuit diagram of the circuit unit of Fig. 1; and
Fig. 5 is a fragmentary cross-section of a representative semi-conductor element of Fig. 1.

In Fig. 1 there is shown a semi-conducting electrical circuit unit 10 constructed according to this invention. A plurality of dry plate rectifier elements 11 are provided for rectifying current supplied to the unit. Each of these elements 11 is the same as the others, and therefore only one will be described in detail.

One of these elements 11 is shown in Fig. 5, such element comprising a base plate 12, which may be of iron, aluminum, or some other suitable conductive metal which has applied to one of its side surfaces a layer 13 of a semi-conducting metal, such as selenium or germanium for example. A counter-electrode 14 of a conductive metal is applied over the layer 13. The counter-electrode might conveniently be made of an alloy comprising 68.5% tin and 31.5% cadmium. By an electroforming process, known in the rectifier art a barrier layer 15 can be created between the counter electrode and the layer 13. For purposes of illustration, the layer 13, counter electrode 14 and barrier layer 15 have been shown disproportionately thick relative to the base plate in the drawings.

Central holes 16 in the dry plates 11 pass a cylindrical insulator sleeve 17 and a bolt 18. A nut 19 can be threaded on the bolt to assemble a stack of rectifier elements. In the circuit unit shown in Fig. 1, two separate circuits are provided the first circuit of the unit beginning at the left in that figure comprises, in this order: an insulating spacer 20, a conductive spacer 21, a terminal 22, a rectifier element 11, a conductive spacer 23, another terminal 23a, a rectifier element 11, another conductive spacer 24, and finally another terminal 25.

An insulating spacer 26 divides the above-described circuit elements from those which comprise a second circuit. In this second circuit, a terminal 27 bears against the insulating spacer 26, and then the following elements are provided in this order: a dry plate rectifier 11, conductive spacer 28, terminal 29, dry plate rectifier 11, conductive spacer 30, terminal 31, conductive spacer 32, dry plate rectifier 11, terminal 33, conductive spacer 34, dry plate rectifier 11, terminal 35, conductive spacer 36, and insulating spacer 37. A tie bar 38 interconnects terminals 27 and 35. The nut 19 is tightened on the bolt 18 to hold the circuit elements, spacers, and terminals firmly together.

The above-described rectifier assembly is next placed in a can 40. A conduit 41 having an inlet connection 42 and an outlet connection 43 through the wall of the can, is wound in spiral loops 44 between adjacent rectifier plates 11, and may be wound so as to make direct contact with the plates between which it stands. Coolant fluid can be forced through the conduit from the inlet to the outlet in order to cool the assembly. The loops of the conduit may be helical and as many in number as desired, and can be placed near the hottest parts of the rectifier assembly to remove the heat most effectively.

With the rectifier assembly and the conduit assembled within the can, the can is filled with an encapsulating compound to substantially totally embed the rectifier plates and the conduit. This encapsulating compound will be selected for its qualities of light weight, thermal conductivity, and resistance to deterioration due to mechanical shock, heat and light. A suitable example of such a compound is: a polyester or epoxy, these types of compound being well known in the plastic art as thermosetting. Of course there are other useful encapsulating compounds, but these have been found to be most satisfactory.

The terminals protrude from the encapsulating compound so that leads can be attached to complete an electrical circuit.

The particular application of the invention shown in the drawings is arranged to provide a circuit component suitable for use with a magnetic amplifier doubler and bridge arrangement. There are, of course, many other circuit elements which can be built up utilizing this invention, and in fact the circuit element shown might be useful in other types of circuits.

As shown in Fig. 4 the connections of Figs. 1 and 2 provide two separate circuits which are separated from each other by the insulating spacer 26. The righthand circuit, which is useful as a bridge with a magnetic amplifier is used in accordance with well-known principles, and has A. C. connections at two opposite terminals 29, 33 of the bridge. Terminal 31 is positive. The end terminals 27 and 35, which are connected by tie bar 38, are negative.

The lefthand circuit element shown is useful as a doubler, and in accordance with conventional use of doublers, is provided with positive terminal 25, negative terminal 22 and one A. C. terminal 23a between the positive and negative terminals. The return circuit for the alternating current will be carried to some other circuit element (not shown) with which such a doubler is commonly used. This is a common doubler arrangement.

The operation of these particular circuit elements forms no part of this invention and need not be described here. However, the passage of electric current through these circuit elements does generate heat, and this heat, if not removed, would result in deterioration of operation of the rectifier. It is the inferior ability of conventional rectifiers to dissipate this heat which has kept the ratio of size to capacity high in hitherto known dry-plate rectifiers.

When current is sent through this circuit unit, a coolant fluid such as water or air is forced through the conduit, and the heat generated by the rectifier elements is carried away. The hitherto-existing stringent limitations on current densities through rectifiers of a given size are reduced by means of this invention, and greater current densities can be carried by circuit units of a given size, as compared with tolerable densities when the unit is simply exposed to air, for example, as a cooling medium. This allows semi-conductor components of minimal size for a given load to be used.

In addition, it is possible to place the conduit near the hottest places on the plates so as to give optimum heat removal.

The encapsulating compound serves to hold the entire assembly together, and eliminates the necessity for any other supports. Since the circuit unit is effectively made a solid block, an optimum strength structure free of vibrational effects is provided.

This rugged circuit unit which can be made of minimum size is particularly suitable for use where space is at a premium, and where resistance to mechanical shock is important. A familiar example is in rocket and aircraft assemblies.

It will be understood that the construction according to this invention is applicable to semi-conductor elements of many types, and the specific examples given of selenium and germanium dry plate rectifiers are not intended as limitations on the general usefulness of the invention. Similarly, the particular circuitry shown for the circuit unit is simply a single example and not a limitation, since numerous circuit variations can be assembled, still utilizing the construction of the invention.

Therefore the invention is not to be limited by the embodiments shown in the drawings and described in the description, which are given by way of example and not of limitation, but only in accordance with the scope of the appended claims.

I claim:

1. A semi-conductor circuit unit comprising a plurality of semi-conductor rectifier elements disposed in parallel spaced relationship from each other, a quantity of encapsulating material substantially totally embedding said rectifier elements, and a coiled conduit for conducting the flow of coolant fluid through the conduit for removing heat from the circuit unit which is generated in the dry plate rectifier elements, said conduit also being embedded in said encapsulating material, said conduit having coils, each of said rectifier elements having at least one coil adjacent thereto.

2. A semi-conductor circuit unit according to claim 1 in which coils are disposed between adjacent rectifier elements.

3. A semi-conductor circuit unit according to claim 1 in which coils are disposed between all pairs of adjacent rectifier elements.

4. A semi-conductor circuit unit comprising: a plurality of semi-conductor rectifier elements electrically interconnected and having terminals for circuit connections, said dry plate rectifier elements being disposed in parallel spaced relationship from each other, a quantity of heat conductive, insulating encapsulating material substantially totally embedding said rectifier elements, but permitting the terminals to protrude therefrom, and a coiled conduit also embedded in said encapsulating material and having a plurality of coils of said conduit between each pair of dry plate rectifier elements, said coiled conduit having a coolant inlet and coolant outlet outside of the encapsulating material for conducting the flow of coolant fluid through the conduit for removing heat from the circuit unit which is generated in the dry plate rectifier elements.

References Cited in the file of this patent

UNITED STATES PATENTS

| 2,439,672 | Roberts | Apr. 13, 1948 |

FOREIGN PATENTS

| 697,213 | Great Britain | Sept. 16, 1953 |
| 1,081,675 | France | June 9, 1954 |